May 20, 1924.
F. LOUISOT
1,494,362
METHOD AND APPARATUS FOR MAKING PULP ARTICLES
Filed Dec. 17, 1920   6 Sheets-Sheet 5
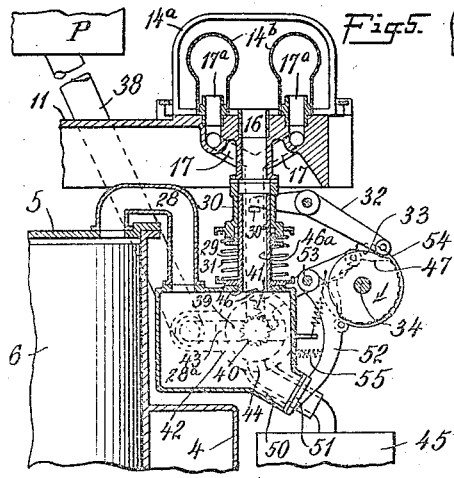
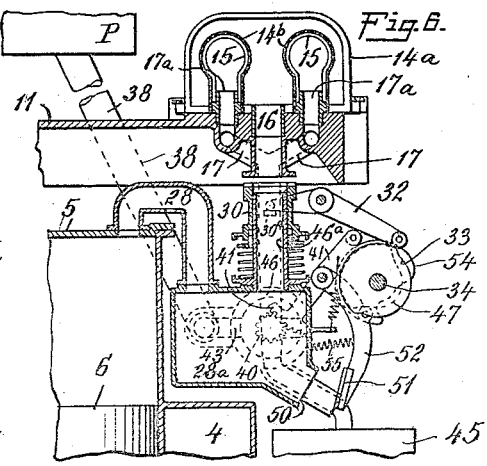
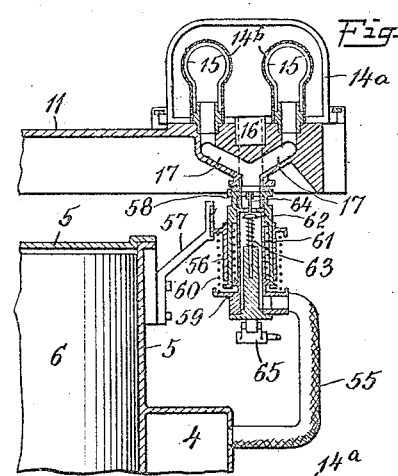
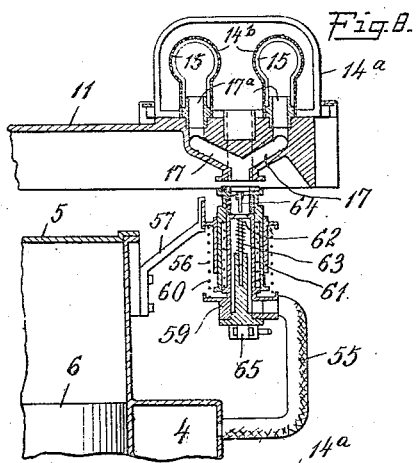
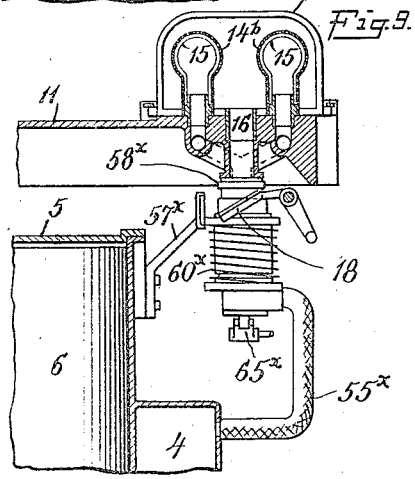
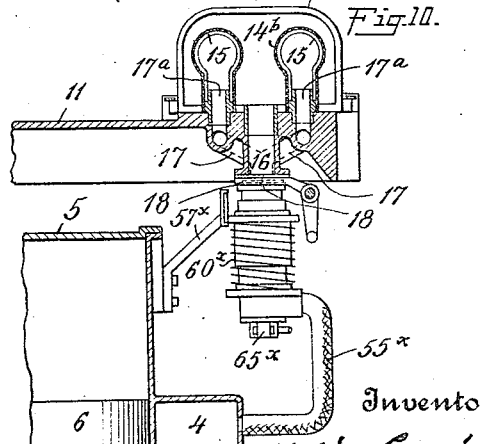
Inventor
Félix Louisot
By his Attorney
F. W. Scherr Jr.

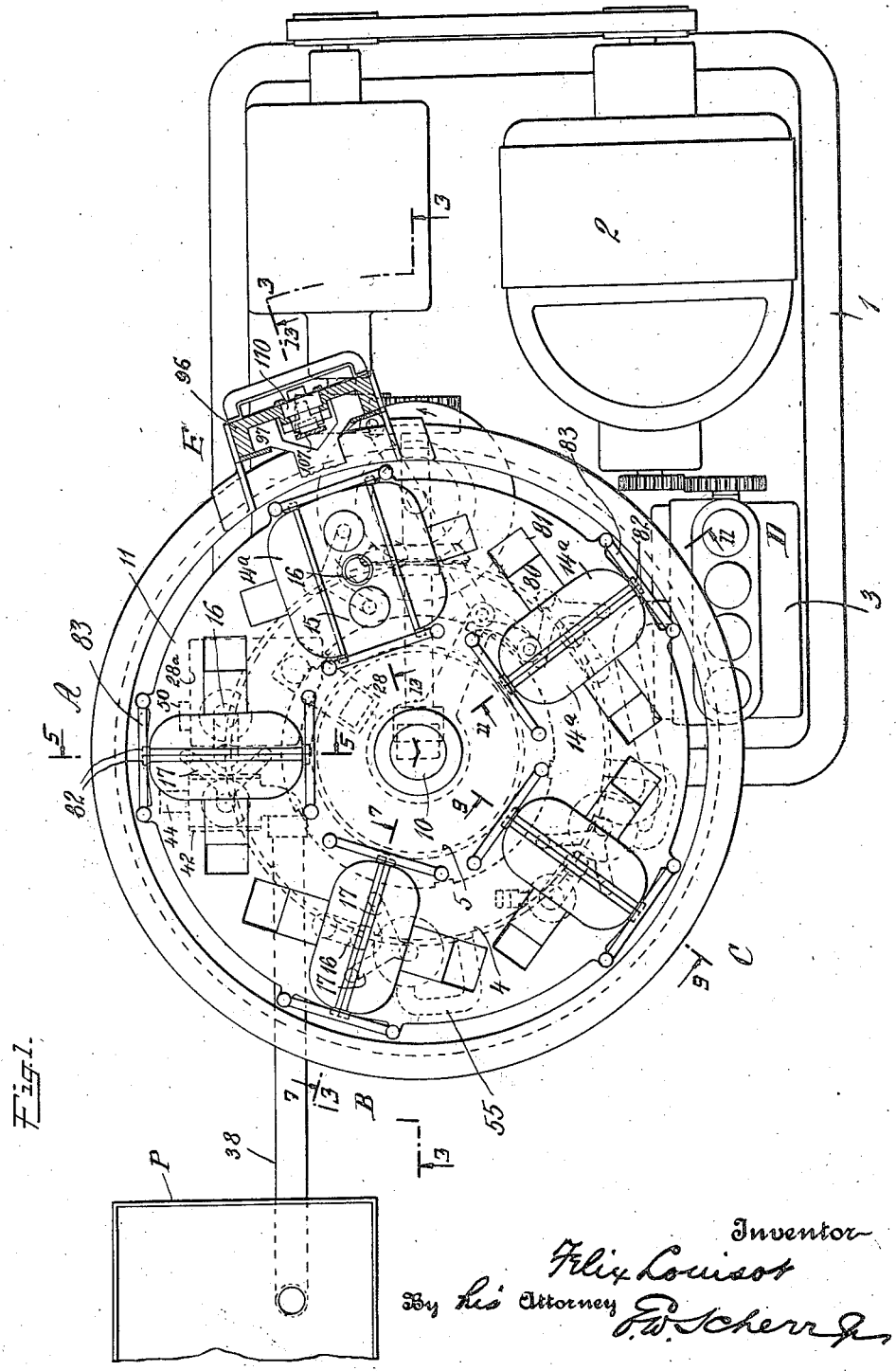

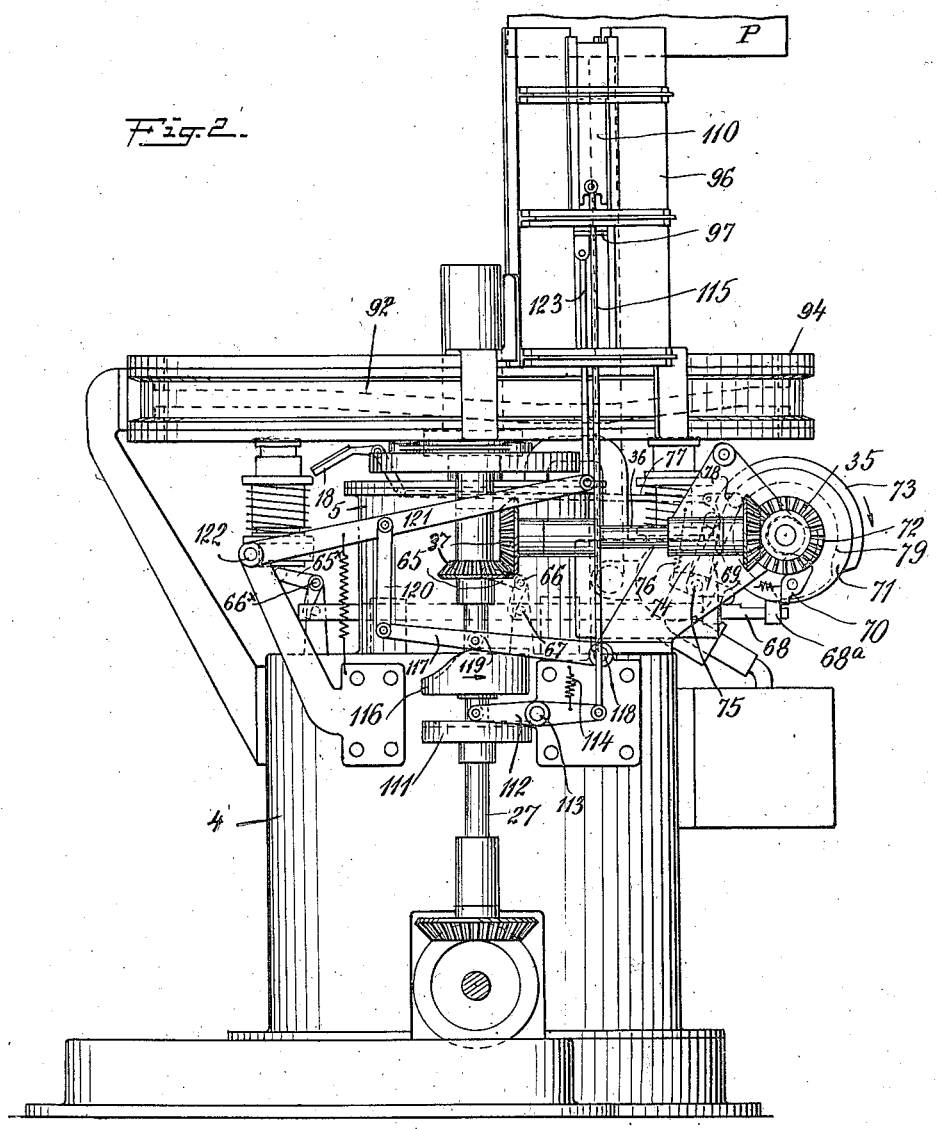

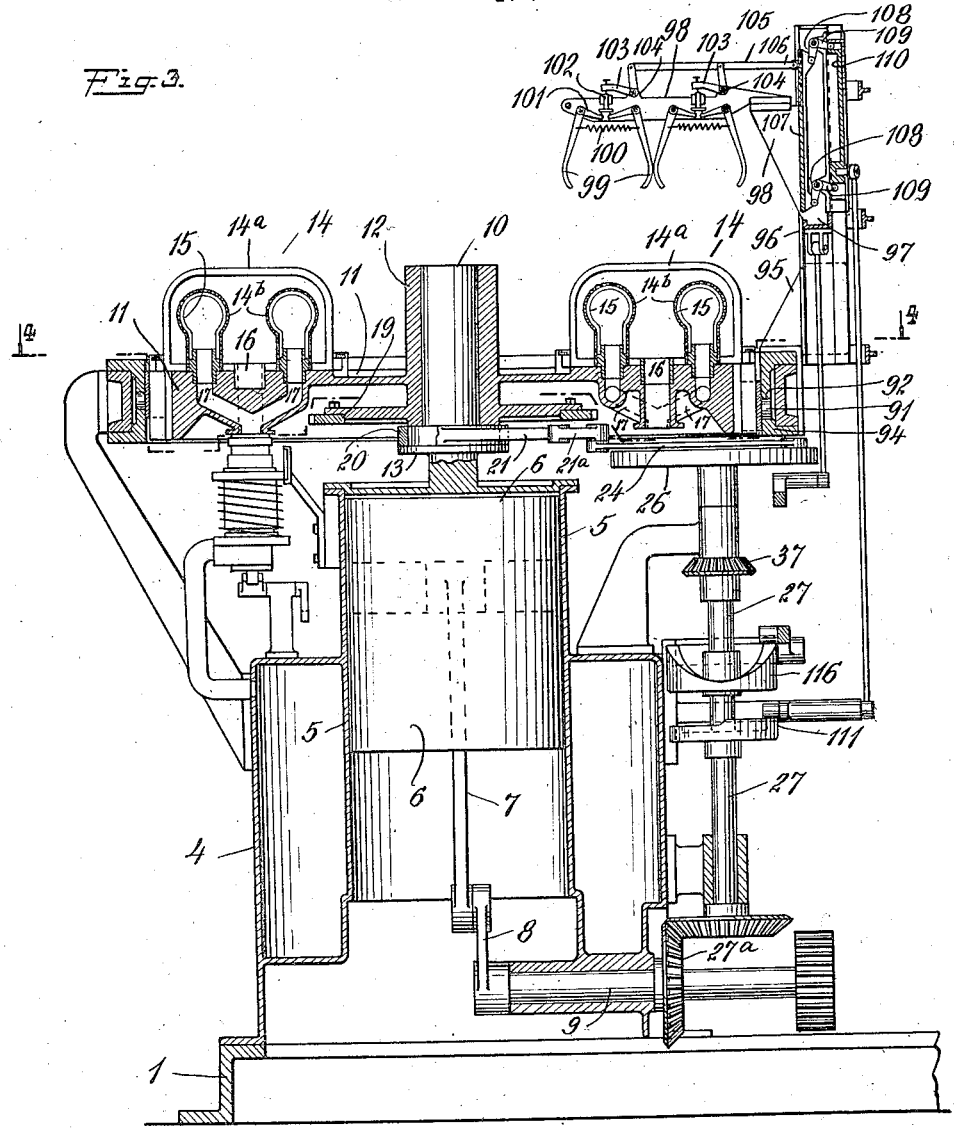

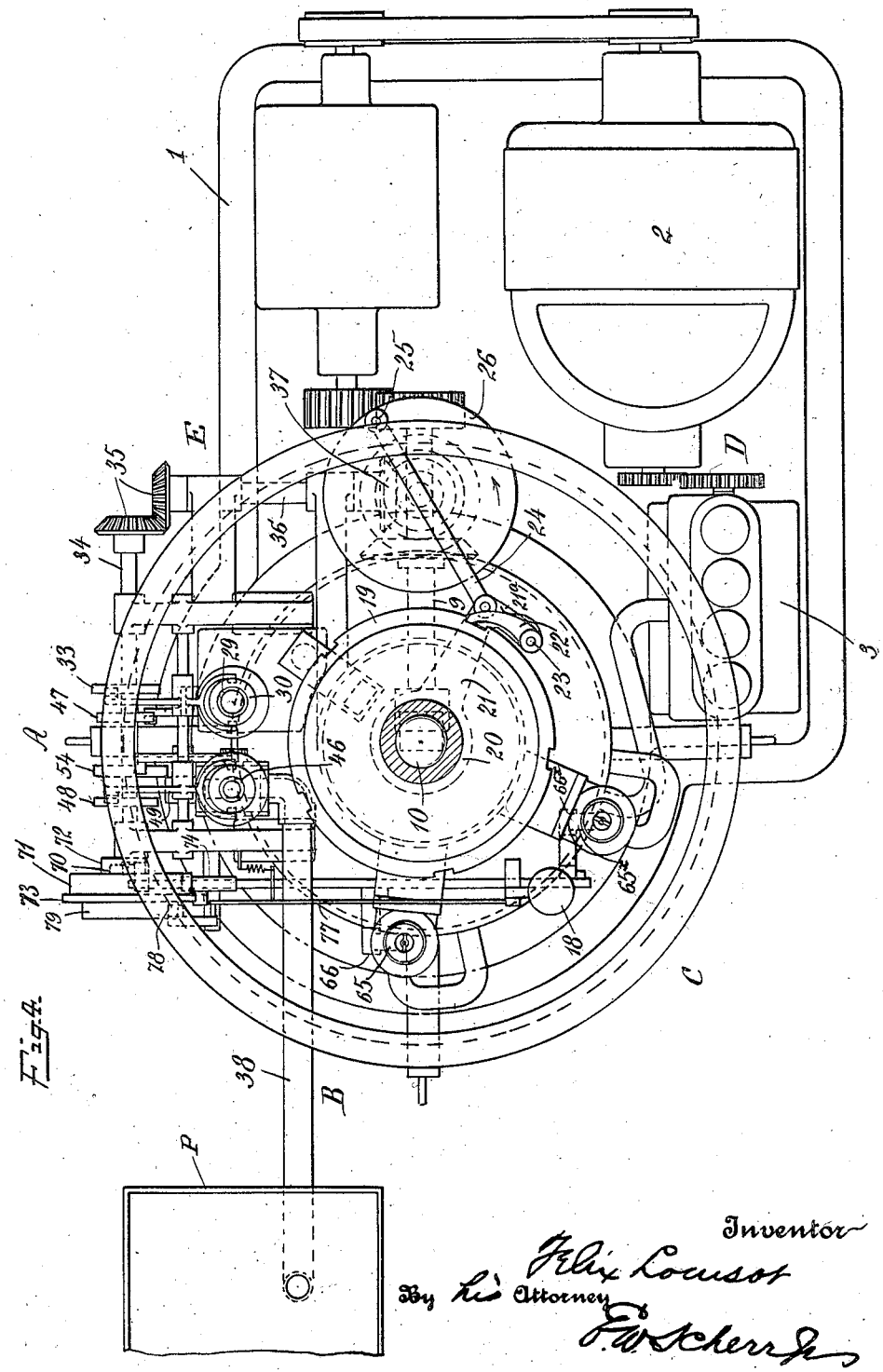

May 20, 1924. 1,494,362
F. LOUISOT
METHOD AND APPARATUS FOR MAKING PULP ARTICLES
Filed Dec. 17 1920 6 Sheets-Sheet 6
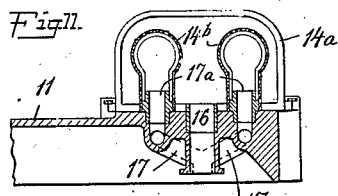
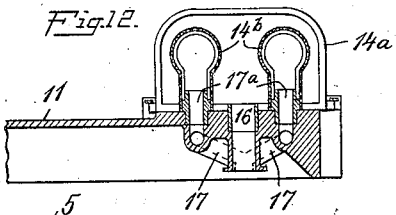
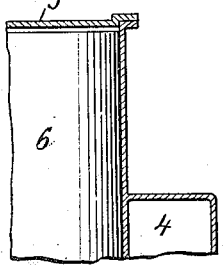
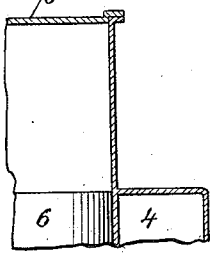
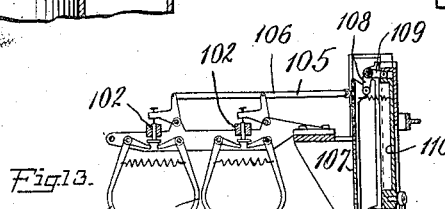
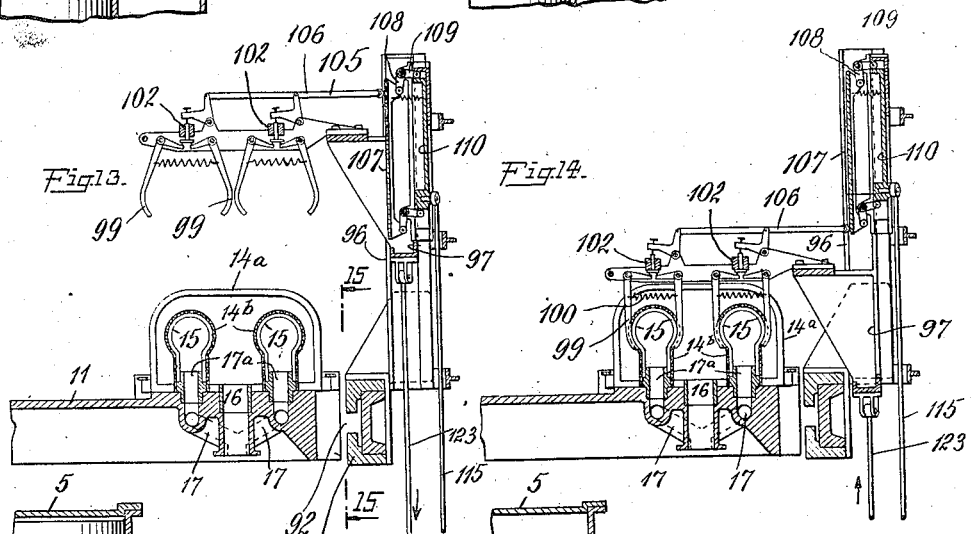
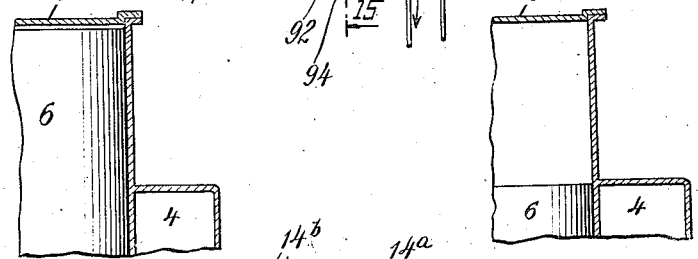
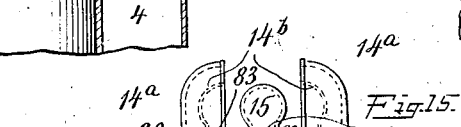
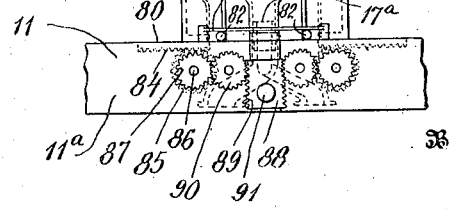
Inventor
Felix Louisot
By his Attorney Patented May 20, 1924.

1,494,362

UNITED STATES PATENT OFFICE.

FELIX LOUISOT, OF NEW YORK, N. Y., ASSIGNOR TO VACUUM PULP PRODUCTS CORPORATION, OF NEW YORK, N. Y., A CORPORATION OF VIRGINIA.

METHOD AND APPARATUS FOR MAKING PULP ARTICLES.

Application filed December 17, 1920. Serial No. 431,498.

*To all whom it may concern:*

Be it known that I, FELIX LOUISOT, a citizen of the Republic of France, residing at New York, in the county of New York and State of New York, have invented certain new and useful Improvements in Methods and Apparatus for Making Pulp Articles, of which the following is a specification.

My present invention relates to improvements in method and apparatus for making pulp articles as shown in my original application Ser. No. 258,187 and comprises the combinations and sub-combinations of steps and devices hereinafter set forth, some of which may be used without the remaining steps or devices or with different steps or devices, although I prefer the full combination embodied in my invention illustrated in the accompanying drawings, these, however, as stated, representing only one of the possible specific embodiments of my improvements.

In the drawings, Fig. 1 is a top or plan view of an apparatus or machine within my invention; Fig. 2 is a side elevation of the machine looked at from the right-hand side in Fig. 1, the motor, air-compressor and speed-reducer being omitted; Fig. 3 is a vertical section, partly in elevation, on the line 3—3 in Fig. 1 looking in the direction of the arrows; Fig. 4 is a plan view similar to Fig. 1 except that the mould-supporting turn-table is removed to show the underlying operating parts, or stated differently, this Fig. 4 is a view on the line 4—4 in Fig. 3 looking in the direction of the arrows; Fig. 5 is a vertical section partly in elevation on the line 5—5 in Fig. 1 looking in the direction of the arrows with the piston 6 beginning its down-stroke and with the other parts correspondingly positioned; Fig. 6 is the same as Fig. 5 except that the piston is beginning its up-stroke with the other parts correspondingly positioned; Fig. 7 is a vertical section partly in elevation on the line 7—7 in Fig. 1 looking in the direction of the arrows with the piston beginning its down-stroke and with the other parts correspondingly positioned; Fig. 8 is the same as Fig. 7 except that the piston is beginning its up-stroke with the other parts correspondingly positioned; Fig. 9 is a vertical section partly in elevation on the line 9—9 in Fig. 1 looking in the direction of the arrows with the piston beginning its down-stroke and with the other parts correspondingly positioned; Fig. 10 is the same as Fig. 9 except that the piston is beginning its up-stroke with the other parts correspondingly positioned; Fig. 11 is a vertical section partly in elevation on the line 11—11 in Fig. 1 looking in the direction of the arrows with the piston beginning its down-stroke and with the other parts correspondingly positioned; Fig. 12 is the same as Fig. 11 except that the piston is beginning its up-stroke with the other parts correspondingly positioned; Fig. 13 is a vertical section partly in elevation on the line 13—13 in Fig. 1 looking in the direction of the arrows with the piston beginning its down-stroke and with the other parts correspondingly positioned; Fig. 14 is the same as Fig. 13 except that the piston is beginning its up-stroke with the other parts correspondingly positioned; Fig. 15 is a front elevation of that part of the mould-opening and closing mechanism carried by the mould-supporting turn-table, only one of the moulds and only a broken-away part of said turn-table being shown, said view being on the line 15—15 in Fig. 13 looking in the direction of the arrows.

Describing now the specific devices of the drawings illustrating said preferred embodiment of my improvements,—the base-plate 1 supports an electric motor 2 geared to and driving an air-compressor 3, which latter compresses the air in a storage-tank in the form of an annular jacket 4 surrounding a vertically disposed stationary cylinder 5 supported mouth-downward on the base-plate. 6 is a hollow piston in the cylinder whose pivoted piston rod 7 is driven by the crank 8 on the shaft 9 (Figs. 1 and 3). A stationary stud 10 projects axially upward from the head of the cylinder 5. 11 is a turn-table whose axial vertical sleeve 12 (Fig. 3) surrounds the stud 10 with rotary bearing-fit, the lower end of said sleeve resting on the collar 13 on said stud 10, said collar thereby operatively supporting the turn-table. The turn-table carries the moulds 14 and the described method of support permits it to be removed and readily replaced by another turn-table having other moulds for a different kind of article, so that one and the same machine is readily convertible in this way to make any desired variety of articles.

The particular moulds shown make a hollow spherical article 15 (Fig. 3) with a cylindrical neck. Further, each mould simultaneously makes two articles in this particular machine, and also there are five equidistantly spaced moulds 14 supported on the turn-table. Compare Fig. 1.

Each mould shown comprises two halves adapted to be separated, to permit the removal of the moulded articles, said removal taking place when the particular mould reaches station E (Fig. 1) in the rotation of the turn-table. Fig. 1 station E is a plan of the opened mould and Fig. 15 is an end-elevation of same with moulded article shown in the center ready for removal. When the halves of the mould are shut together as shown in the plan view at station A (Fig. 1), the mould is in condition for moulding the articles. At this time each mould consists of an outer air-tight shell 14$^a$ and of inner hollow shells 14$^b$ each perforated like a screen, and interiorly shaped like the exterior of the pulp articles to be moulded.

At station A (Fig. 1) suction is applied to the chamber between the outer shell 14$^a$ and the inner perforated shells 14$^b$ via the duct 16 in the turn-table. At this time the interior of the perforate shells is connected with the pulp mixture via the forked duct 17 in the turn-table. This forms the articles by suction against the interior of the perforate shells and partially sucks them dry of the water or other liquid in the pulp mixture. For this operation, the turn-table is stationary, say, for instance, for three seconds. During this three seconds, the piston 6 makes its down stroke to create the suction in the tight upper end of the cylinder 5 which is used to form the articles as aforesaid by suction in the mould at station A.

During the next three seconds in the operation of the machine, the piston makes its up-stroke and simultaneously the turn-table automatically revolves anti-clockwise in Fig. 1 through one-fifth of a rotation to carry the moulds, each to the next station, the mould which previously was at station A now being at station B, and so on as to the other moulds. The turn-table and the carried moulds then automatically come to rest and remain so for the next three seconds, whereupon, as the piston descends during said three seconds, another pair of articles is formed by suction at station A as previously indicated. At station B during said three seconds rest of the turn-table, compressed air derived from the storage tank 4 is automatically delivered interiorly through the forked duct 17 into and through the formed pulp articles in the perforate shells 14$^b$. This drives still more of the water out of the pulp-articles into the interior of the shell 14$^a$ and out through duct 16 which at this station B is open to the atmosphere.

Next, the turn-table automatically moves another fifth of a rotation to advance all of the moulds to the next station, so that the mould just described as having been drained by compressed air at station B is now at station C.

At station C, the turn-table rests for three seconds and the compressed air is again automatically applied interiorly to the articles exactly as at station B for say two seconds. Then for the remaining second the liquid-escape outlet 16 in the turn-table is automatically closed by a certain valve 18 (as in Fig. 10) which results in the accumulation of air-pressure in the chamber between the outer shell 14$^a$ of the mould and the inner shells 14$^b$ containing the pulp-articles. When this second is up, the automatic retraction of the compressed air coupling (to permit the next partial rotation of the turn-table) causes the interior of the pulp-articles to be suddenly vented to the atmosphere and causes the accumulated compressed air in the outside chamber of the mould to press suddenly against the outer surface of the pulp-articles in the perforate shells 14$^b$ sufficiently to disengage and free them from the interstices of the wire-mesh (or other form of perforate screening) of which the shells 14$^b$ are made. At the next operation the halves of this mould will be separated, and this would tend to tear away the surface of the pulp-articles if it were not for this air-shock which they receive at station C to free them from the mesh of the moulds.

At station D in this particular machine, nothing happens to the mould at said station D but during the succeeding travel of said mould to the next station E, the halves of the mould are automatically separated as shown in plan in Fig. 1 and in end-elevation in Fig. 15. The particular means for accomplishing this will be described later along with the other details of the apparatus and process.

At station E, while the opened mould is at rest for three seconds, the grippers shown at the upper right corner in Fig. 3 automatically descend, grip and remove the articles which are now finished so far as this machine is concerned.

During the next three seconds movement of the turn-table, the opened mould automatically closes in passing from station E back to the initial station A ready for the pulp-receiving operation at that station.

It will be understood that the described operations at stations A, B, C and E are severally taking place simultaneously at said stations during each three seconds rest-period of the turn-table; and that the pulp delivered into the machine at A comes out in the form of the finished articles at E.

The above being the general mode of operation of the method and apparatus, the following will serve to describe the details and will also connect said mode of operation with the particular means shown for accomplishing it.

The means for securing the described rest-periods of the turn-table separated by the described partial rotation periods comprises the following: 19 is a notched disc secured concentrically to the sleeve 12 of the turn-table underneath said table. 20 (Figs. 3 and 4) is a ring resting on the stationary collar 13 and surrounding said sleeve 12 with a rotary bearing-fit. 21 is a radial arm integral with said ring 20 having at its free-end a transverse extension 21ª on which the ratchet or pawl 22 is pivotally supported at 23 with its nose spring-pressed (spring not shown) against the notched edge of the disc 19. 24 is a link which operatively connects said arm 21 with a pivot-pin 25 (Fig. 4) on the rotary disc 26, the latter being mounted on the upper end of a shaft 27 continuously driven from the shaft 9 through the bevel gears 27ª (Fig. 3). Figs. 1, 2, 3 and 4 represent the beginning of a rest-period of the turn-table 11 with the piston 6 starting downward and with the link 24 (Fig. 4) beginning to swing the arm 21 and pawl 22 idly to the left in said Fig. 4 due to the anti-clockwise rotation of the disc 26 until the nose of the pawl engages the next notch X of the disc. By this time the rest-period of the turn-table is up and the turning-interval about to begin, this latter being effected by the forward pull of the rotary disc 26 on the link 24 and pawl 22 in the notch X, and ends when a fifth of a rotation has been effected and the parts are again in the position shown in Fig. 4, ready to be followed by another rest-period of the notched disc 19 and turn-table, and so on indefinitely as long as the machine is driven.

The described five moulds are equidistantly spaced circumferentially on the turn-table. At each mould there is a duct 16 in the turn-table leading up centrally to the outer chamber of the mould when its halves are closed; and there is also a forked-duct 17 in the turn-table whose branches lead to the upwardly projecting nipples 17ª in the turn-table which are severally located in the necks of the perforate chambers 14ᵇ of the closed moulds. The neck of each moulded article 15 surrounds its nipple 17ª and is supported thereby after the halves or parts of the mould have been separated as in Fig. 15 preparatory to removing the articles.

Reverting now to station A, Fig. 5 shows the turn-table and related parts at this station positioned as they are during one of the rest-periods with the piston 6 beginning its down-stroke. 28 is a pipe connecting the vacuum chamber in the cylinder 5 with an opening in the top of the closed tank 28ª. 29 is a tube extending vertically from the top of said tank fitted at its upper end with a vertically slidable coupling-sleeve 30 pressed upwardly by the compression spring 31 so as to engage the duct 16 of the turn-table during each of its rest periods to suck the pulp against the interior of perforate shells 14ᵇ and draw the water through said shells down into the tank 28ª. 32 is a lever supported on an intermediate pivot operated at its right-end in Fig. 5 by the cam disc 33 and having its forked other end (compare Fig. 4) straddling the coupling-sleeve 30 to bear down on the lugs 30ª on said sleeve whenever as in Fig. 6 the high part of the cam engages the lever. This latter happens during each turning-period of the turn-table whereby the sleeve 30 is disengaged from the mouth of the duct 16 to cut off the suction from the mould at station A and permit the table to take the mould to station B.

The aforesaid cam disk 33 is mounted on a shaft 34 driven by bevel gears 35 from an intermediate shaft 36 which in turn is driven by bevel gears 37 from the shaft 27, all in proper timed relation to accomplish the proper operation of the machine,—this latter being a general statement applying to all the other timed, cam and gear operated parts of the machine.

Still referring to Fig. 5, the liquid pulp mixture is supposed to be delivered from the tank P by gravity through the pipe 38 to a rotary 3-way valve 39 (Figs. 5 and 4), said valve having at one end a pinion 40 meshing with an operating rack 41 on the end of a lever 41 operated from a suitable cam-disc 47 on the shaft 34. Said rotary valve, as usual, works in a cylindrical casing 42 having three outlets (Fig. 5),—one outlet 43 connecting with the pulp-delivery pipe 38, a bottom outlet 44 leading to a so-called back-wash tank 45; and a top outlet 46 connected with a tube and spring-pressed coupling-sleeve 46ª (Fig. 4) similar to the previously described tube 29 and sleeve 30, said newly mentioned tube and sleeve being located directly behind 29 and 30 in Fig. 5 to act as a retractile coupling to deliver the pulp mixture to the forked ducts 17 in the turn-table and thence into the perforate shells 14ᵇ of the mould. A suitable cam-disc 48 on the shaft 34 similarly operates a forked-lever 49 to retract said spring-pressed sleeve 46ª when the turn-table is in motion.

During each rest-period, the couplings 30 and 46ª are both in their "up" position at station A. Also the 3-way valve 39 is in the position shown in Fig. 5 wherein it connects the pulp tank with the interior of the perforate shells 14$^b$ so that the pulp flows into them by gravity. At the same time the descending piston 6 (Fig. 5) is sucking the pulp against the screening of said shells 14$^b$ and sucking the water from the outer chambers of the mould down via the coupling 30 into the tank 28$^a$ which is designed to be large enough to hold the water delivered to it in this way during one of said rest-periods. Towards the end of each rest-period, the 3-way valve is cammed into the position shown in Fig. 6 wherein it cuts off the pulp-supply from the mould and now connects the interior of the perforate shells 14$^b$ with the back-wash tank 45 so as to deliver into said tank any pulp mixture remaining in the pipe connections between the 3-way valve and the mould.

The water-tank 28$^a$ (Figs. 5 and 6) has a gravity outlet 50 controlled by a valve 51 on the lever 52 pivotally supported at 53 and operated at its upper end by a suitable cam-disc 54 (compare Fig. 4) on the shaft 34. A spring 55 tends to close the valve, which is its condition (Fig. 5) during the rest-period of the turn-table while the piston 6 is sucking the pulp-water through the perforate shells 14$^b$ at station A down into the tank 28$^a$. During each turning-interval, however, the stated cam-disc automatically opens said valve 51 as in Fig. 6, venting the tank-contents into the tank 45 or some other receptacle.

Fig. 7 shows the turn-table at rest with the compressed air in jacket 4 being delivered by a flexible pipe 55 at station B via a retractile coupling through the forked ducts 17 in the turn-table into the interiors of and through the pulp articles 15 in the perforate shells 14$^b$ to force any free liquid out of the pulp into the outer mould chamber and thence through the escape duct 16 which at this station is open to the atmosphere.

The only feature needing further explanation at this station B is the aforesaid retractile coupling for delivering the compressed air. This consists of three nested sleeves telescoping on one another, the outer sleeve 56 being stationarily supported by a bracket 57 mounted on the cylinder 5. The upper end 58 of the middle sleeve is the actual delivery-mouth of the nozzle adapted to engage the turn-table duct 17. Between the inner sleeve 59 and the outer and middle sleeves respectively are the spiral springs 60 and 61. The inner sleeve is closed except for a port at its upper end controlled by a valve 62 axially and slidably supported within said sleeve and being impelled by spring 63 into closing position on said port. Supported axially in the mouth 58 of the nozzle is a rod 64 which presses open the valve 62 (compare Figs. 8 and 7) when the inner sleeve 59 is pressed upwardly to bring the nozzle 58 into engagement with the duct 17 in the turn-table. Thereupon the compressed air in the tank 4, tubing 55 and inner sleeve 59 is delivered past the opened valve 62 into said turn-table duct. The means for lifting the aforesaid compressed-air retractile coupling is an elbow-lever 65 (Figs. 7, 2 and 4), pivotally supported at 66 underneath the coupling, said elbow lever being operated in lifting direction by a pin 67 (Fig. 2) on a suitably supported push-rod 68. Fig. 2 shows this rod pushed to the left to lift the compressed air couplings and also shows it locked in said position by the latch 69. The means for pushing the rod 68 to the left as aforesaid comprises a tilting pawl 70 pivoted to the face of the disc 71. As said pawl rotates with said disk, its foot engages the stationary cam 72 to swing the nose of the pawl outward so as to abut against the collar 68$^a$ on the rod 68 and push said rod to the left into the latched position shown in Fig. 2. By this time the foot of said pawl has cleared the aforesaid stationary cam 72 so that it can tilt itself out of further engagement with the rod 68. The parts are so timed that this latching of the compressed air couplings in their "up" position engaging the turn-table ducts occurs at the beginning of the rest-intervals of the turn-table. At the end of said intervals they are automatically unlatched (and therefore retracted due to their coiled springs 60, etc.) by the high part of a cam-disc 73 (Figs. 2 and 4) riding under an arm 74 which forms with the latch 69 an integral elbow lever pivotally supported at 75. 76 is a spring which impels said latch in latching direction relative to said push-rod 68.

Fig. 8 only differs from Fig. 7 in showing the aforesaid compressed-air coupling in its retracted or "down" position with the turn-table beginning to rotate and with valve 62 automatically closed so as to prevent loss of compressed air.

Fig. 9 shows the condition at station C during the first two seconds which is identical with the condition at station B just described. The compressed air coupling in this Fig. 9 is identical in construction with that shown in Fig. 7 and is lifted simultaneously therewith by another elbow-lever 65$^x$ (Fig. 4) pivoted at 66$^x$ and whose other arm is pushed against and operated by a pin on the same push-rod 68 that operates the elbow-lever 65 and air-coupling in Fig. 7 at station B.

The new feature in Fig. 9 compared with Fig. 7 is the valve 18 previously described as taking part in the accumulation of air-pressure in the outside of the mould to effect a counter-shock in the pulp articles to disengage them from the meshes of the mould. Fig. 10 shows this valve closed. This occurs during the latter part of the rest-period of the turn-table and is brought about by a push on the rod 77 (Figs. 2 and 4) pivoted to the upper end of an arm 76 whose lower end is pivotally supported at 75 on the framework of the machine and whose upper-end has a roller which bears against the cam-disc 79 designed to operate the valve 18 in the manner heretofore described. Said cam-disc 79 keeps the valve 18 closed after the compressed-air coupling has been retracted and the turn-table has started to rotate. In other words, the compressed air is kept trapped in the outer chamber of the mould until after the interiors of the pulp-articles and of the perforate shells 14ᵇ have been vented to the atmosphere with the result that said compressed air, in suddenly escaping through the perforate shells, shocks the contained pulp-articles away from said perforate shells sufficiently to free the pulp from their meshes or perforations. It will be noted from Fig. 10 that the mouth of the duct 16 has a sliding contact with the valve 18 so that the rotation of the turn-table is not interfered with. After the turn-table has moved a short distance, the valve 18 is automatically opened by the cam-disc preparatory to its next closure.

At station D nothing is done to the articles in the mould, Fig. 11 showing the mold at this station when the turn-table is in its rest-period with the piston on its down stroke; and Fig. 12 showing the same when the mold is beginning to move towards the next station E with the piston on its up-stroke.

In moving from station D to E, the halves of the mould are automatically separated as shown in plan at E in Fig. 1 and in end-elevation in Fig. 15. The means for accomplishing this comprises the following: Each half of the mould has a foot 80 slidably guided in a slot-like opening 81 in the turn-table. The ends of each half of the mould adjacent the turn-table are provided with rollers 82 bearing against the underside of tracks 83 (Figs. 1 and 15) secured to the turn-table in parallel spaced relationship thereto so as to hold the halves of each mould down against the turn-table during their sliding movements thereon in opening and closing. The underside of each foot is a rack 84 engaged by a pinion 85 on a shaft 86 suitably supported under the turn-table, each said shaft extending outwardly through the rim 11ᵃ of the turn-table and being exteriorly provided adjacent said rim with another pinion 87. 88 is a vertically slidable tongue suitably supported in guide-ways in the rim of the turn-table below each mold as best shown in Fig. 15. Rack-teeth 89 are provided on both side-edges of each tongue engaging idler pinions 90—90, which latter in turn respectively mesh with the above described pinions 87—87. Obviously, sliding the tongue 88 downwardly will separate the halves of the mould as in Fig. 15; and vice versa sliding it upwardly will close them together. To accomplish this automatically from the rotation of the turn-table, a roller or stud 91 (Figs. 15 and 3) on each tongue projects into a continuous cam-groove 92 (Figs. 12, 1, 2, 3, etc.) in the inside face of a stationary ring 93, which concentrically surrounds the turn-table 11 and is supported in said position by brackets 94 (Fig. 3) etc., from the lower stationary portions of the machine. This cam-groove is so disposed that it keeps the tongues 88 of all of the moulds in their up-position with said moulds closed while they are positioned at stations A, B, C and D; whereas said cam-groove 92 beyond station D inclines downwardly and therefore lowers the tongue 88 of and opens any mould traveling towards station E; and said cam-groove maintains said lower level to keep said mould open at said station E but rises beyond said station so as to raise the tongue 88 of the mould and thereby close said mould before it reaches station A.

While each mould is open at station E during the rest-period of the turn-table, mechanism as follows causes grippers to descend and remove the articles 15 upwardly from between the halves of the mould, and then automatically to release them for removal to a belt conveyer, tray or other carrier. Thus, 95 designates brackets supporting the stationary vertical frame 96 at the E station of the machine. 97 is a vertically slidable carriage suitably guided and supported on the front side of said frame 96. 98 is an arm projecting rigidly from said carriage 97 over the turn-table. This arm supports two pairs of grippers, each pair consisting of two depending pivoted arms 99 pulled together by a tension spring 100. Said arms 99 at their upper or pivoted ends have inwardly directed integral arms 101. Overlying the ends of these arms 101 is the enlarged head of a plunger 102 guided for vertical reciprocation. 103 is a bell crank, one for each plunger 102 for pressing it downwardly to open the arms 99—99. Each bell crank is pivoted at 104 to the arm 98. The operating rod 105 pivotally connects with both bell-cranks, its other end being pivotally connected at 106 to the vertical member 107 whose upper and lower ends are pivotally connected by the parallel links 108—108 to the front of the aforesaid carriage 97. 109—109 are horizontal arms which are integral with the upper ends of the aforesaid links 108—108 and serve to operate them by having their free ends engaged in sockets in a vertical slide-member 110 suitably mounted and guided on the back of the stationary frame 96. This slide is raised and lowered by a cam-disc 111

(Figs. 2 and 3) on shaft 27 on which rides the roller-end of an arm 112 pivotally supported at 113 on the machine-frame and having its other end upheld by the spring 114. A rod 115 pivotally connects this end of said arm 112 with the aforesaid slide 110. From an inspection of Fig. 3, it will be seen that when the cam 111 pushes the slide 110 up, it results in pulling the member 107 inwardly as in Fig. 14 and in lifting the plungers 102, so that the springs can pull together the arms 99 to grip the articles 15 between them. Vice versa, when the cam 111 permits the slide 110 to descend as in Fig. 13, it forces the member 107 outwardly so that the rod 105 and bell-crank push the plungers 102 downwardly to open the grippers 99. The aforesaid can 111 is timed so that the grippers 99 remain open until the carriage 97 has been lowered from its up-position in Fig. 13 at station E to its down-position so that said grippers straddle the articles 15 in the stationary open moulds. Thereupon the cam 111 acts to close the gripper on the articles whereupon the carriage is lifted to carry the articles vertically upward out of the mould, and then the cam 111 again acts to open the grippers 99 to release the articles.

The automatic means for raising and lowering as aforesaid the carriage 97, together with its supported grippers 99, and gripper-operating slide 110, comprises the cam 116 (Figs. 2 and 3) on the shaft 27, arm 117 pivoted to the machine-frame at 118 having a roller 119 intermediate its length bearing on said cam, and having its free-end connected by a link 120 with the middle portion of another arm 121 pivoted at one end 122 to the machine-frame and having its other end pivotally connected to the carriage 97 by the vertical rod 123.

Of course, changes and modifications can be made in the above illustrated and described method and apparatus for making pulp-articles without departing from the spirit of my invention and of the following claims; and any and all such I intend to cover hereby.

What I claim is:

1. The improvement in the art of making pulp articles which comprises applying suction to the outside of a perforate mould containing a liquid pulp mixture to pull the liquid through the mold and the pulp against its interior to form the article, applying compressed air to the inside and accumulating the compressed air on the outside of the article in said mould, and then venting the compressed air from the inside of the mould to the atmosphere.

2. A machine for moulding pulp-articles comprising a series of moulds; shells surrounding said moulds; a reciprocating piston-cylinder device having alternate suction-strokes; a coupling connected with the piston-cylinder device; means for moving said series of molds past said coupling with intermediate periods of rest of the respective moulds at said coupling; means for engaging said coupling with the respective moulds during said rest-periods; and means for timing said rest-periods to occur during the suction-strokes of the piston-cylinder device.

3. A machine for moulding pulp-articles comprising a series of moulds; shells surrounding said moulds; a reciprocating piston-cylinder device having alternate suction-strokes; a coupling connected with the piston-cylinder device; means for moving said series of moulds past said coupling with intermediate periods of rest of the respective moulds at said coupling; means for engaging said coupling with the respective moulds during said rest-periods; means for timing said rest periods to occur during the suction-strokes of the piston-cylinder device; and means for disengaging said coupling from the respective moulds at the end of the rest-periods and keeping it disengaged during the movement-periods of the moulds.

4. A machine for moulding pulp-articles comprising a series of moulds; shells surrounding said moulds; means for moving said series in a closed path with intermediate periods of rest of said moulds; a suction-coupling device; a compressed air-coupling device; and a pulp-article removing device; means for causing all of said devices to act simultaneously on different moulds in said series during each rest-period thereof; and means for opening each mould during its travel-period after leaving the compressed air-coupling and before it reaches the aforesaid pulp-article removing device.

5. A machine for moulding pulp-articles comprising a rotary turn-table, a concentric series of molds on said turn-table; shells surrounding said moulds; ducts in said table leading to and from said moulds; means for giving partial rotations to said turn-table with intermediate rest-periods; a pulp mixture delivery coupling and a suction-coupling and means for engaging them with the turn-table ducts of one of the moulds during each rest-period of the table; a compressed air-delivery coupling and means for engaging it with the turn-table duct of an adjacent mould during each rest-period of the table; and means adjacent said table to operate on each mould as it travels to open said mould preparatory to the removal of the pulp-article therefrom and thereafter to close said mould.

6. A machine for moulding pulp-articles comprising a rotary turn-table, a concentric series of moulds on said turn-table; shells surrounding said moulds; ducts in said table, one leading to the moulds and the other to the shells; means for giving partail rotations to said turn-table with intermediate rest-periods; a pulp supply station, a compressed air supply station and means for connecting the mould duct to the pulp supply and the shell duct to the compressed air supply during the rest-periods of said table to form the pulp-articles in the moulds.

7. A machine for moulding pulp articles comprising a vertical cylinder with its head uppermost, a piston working in said cylinder, a vertical stud on said cylinder-head, a horizontal turn-table rotatably supported on said stud, a concentric series of moulds on said turn-table, shells surrounding said moulds, ducts leading from the bottom of said table, one communicating with the moulds and the other with the shells, a pulp supply station, means for giving said table partial rotations with intermediate rest-periods, couplings under the turn-table ducts during the rest-periods of the table for connecting the moulds with the pulp-supply and the shells with the upper end of the aforesaid cylinder.

8. A machine for moulding pulp-articles comprising a vertical cylinder with its head uppermost, a piston working in said cylinder, a vertical stud on said cylinder-head, a horizontal turn-table rotatably supported on said stud, a concentric series of moulds on said turn-table, shells surrounding said moulds, ducts leading from the bottom of said table, one communicating with the moulds and the other with the shells, means for giving said table partial rotations with intermediate rest-periods, a pulp supply station, couplings under the turn-table ducts during the rest-periods of the table and moulds for connecting the molds with the pulp supply and the shells with the upper end of the aforesaid cylinder, the down, suction-stroke of the piston being timed to occur during the rest-periods of the turn-table and with the engagement of the suction-coupling with the given turn-table duct.

9. A machine for moulding pulp-articles comprising a traveling mould having separable parts to permit the removal of the article, a vertical slide adjacent the mould traveling therewith and operatively connected with its parts so that the vertical movement of the slide opens and closes the mould, and a stationary cam adjacent the path of the mould operatively engaging said slide.

10. A machine for making pulp-articles comprising a mould having an outer non-perforate shell, and an inner perforate shell whose interior shapes the outside of the pulp-article, an inlet duct leading to the interior of the perforate shell, an outlet duct leading from the non-perforate shell, a valve controlling said outlet duct, means for connecting compressed-air with the inlet duct after the pulp article has been formed in the perforate shell, and then venting said duct to the atmosphere.

11. A machine for making pulp-articles comprising a mould having an outer non-perforate shell, and an inner perforate shell whose interior shapes the outside of the pulp-article, means for forming the pulp article against the interior of the perforate shell; means for applying compressed air to the inside and accumulating the compressed-air on the outside of said article in said perforate shell and thereafter for venting the interior of said shell to the atmosphere.

12. A machine for making pulp-articles comprising an intermittently traveling mould in separable parts; means for opening said mould; means for removing the moulded article from the opened mould during the rest-period of said mould, said means comprising a vertically movable carriage, means for lowering said carriage during the rest-period of the mould, and then lifting it, grippers on said carriage which straddle the pulp-article in the mould when the carriage is in its lowered position, and means on the carriage which at this time and prior to the aforesaid lifting movement of said carriage positively move the grippers inward to grasp the article and which causes the grippers to release the article after the carriage has lifted the article out of the mould.

13. The improvement in the art of moulding pulp-articles by perforate moulds which comprises applying compressed-air to one side of the moulded article sustained on the mould, accumulating the compressed-air on the opposite side of the article on the mould and then venting the compressed-air from the first mentioned side of the mould to the atmosphere.

14. The improvement in the art of moulding pulp-articles by perforate moulds which comprises in supplying a predetermined pressure to both sides of a moulded article while sustained on the mould, and then suddenly venting the pressure from the side of the mould upon which the article is formed.

15. The improvement in the art of making pulp-articles which comprises moulding the article against the interior of a perforate mould, then subjecting the exterior of the article in said mould to an air-shock to free it from the perforations of the mould to permit the ready removal of the completed article from the interior of the mould.

16. A machine for moulding pulp articles comprising a movable conveyor, a series of progressively arranged moulds on said conveyor, a shell surrounding each of said moulds, a plurality of series of ducts in the moulds, one in each series leading to a conveyor one and the other to a shell, a liquid pulp mould and the other to a shell, a liquid pulp supply station, a compressed-air supply station and means for connecting the duct leading to the moulds to that of the pulp supply station and the ducts leading to the shells to that of the compressed-air supply station as the conveyor is progressed into registration with the respective stations.

17. A machine for moulding pulp-articles comprising a movable support, a series of moulds on said support, shells surrounding said moulds, ducts in said support one leading to the moulds and the other to the shells, means for giving said support partial movements with intermediate rest-periods, couplings, and means for engaging said couplings with the ducts in the support during the rest-periods of said support to form pulp-articles in the moulds.

18. The improvement in the art of making pulp-articles which comprises applying suction to the outside of a perforate mould containing a liquid pulp mixture to pull the liquid through the mould and the pulp against its interior to form the article, supplying a predetermined air pressure to both sides of the moulded article while sustained on the mould, and then venting the air from the interior of the mould.

19. The improvement in the art of making pulp-articles which comprises applying suction to the outside of a perforate mould containing a liquid pulp mixture to pull the liquid through the mould and the pulp against its interior to form the article, supplying an air pressure to one side of the moulded article while sustained on the mould, accumulating the compressed air on the opposite side of the article and then venting the air from the first mentioned side of the mould.

20. The improvement in the art of moulding pulp-articles by perforate moulds which comprises applying compressed air to the inside of the moulded article sustained on the mould, accumulating the compressed-air on the outside of the article on the mould and then suddenly venting the pressure from the inside of the mould.

21. The improvement in the art of making pulp-articles which comprises applying suction to one side of a perforate mould which is in communication with a liquid pulp-supply to pull the liquid through the mould and deposit the pulp on the surface of the mould, supplying compressed air to both sides of the sustained article and then suddenly venting the pressure from the article forming side of the mould.

In testimony whereof I affix my signature.

FELIX LOUISOT.